Patented Sept. 20, 1927.

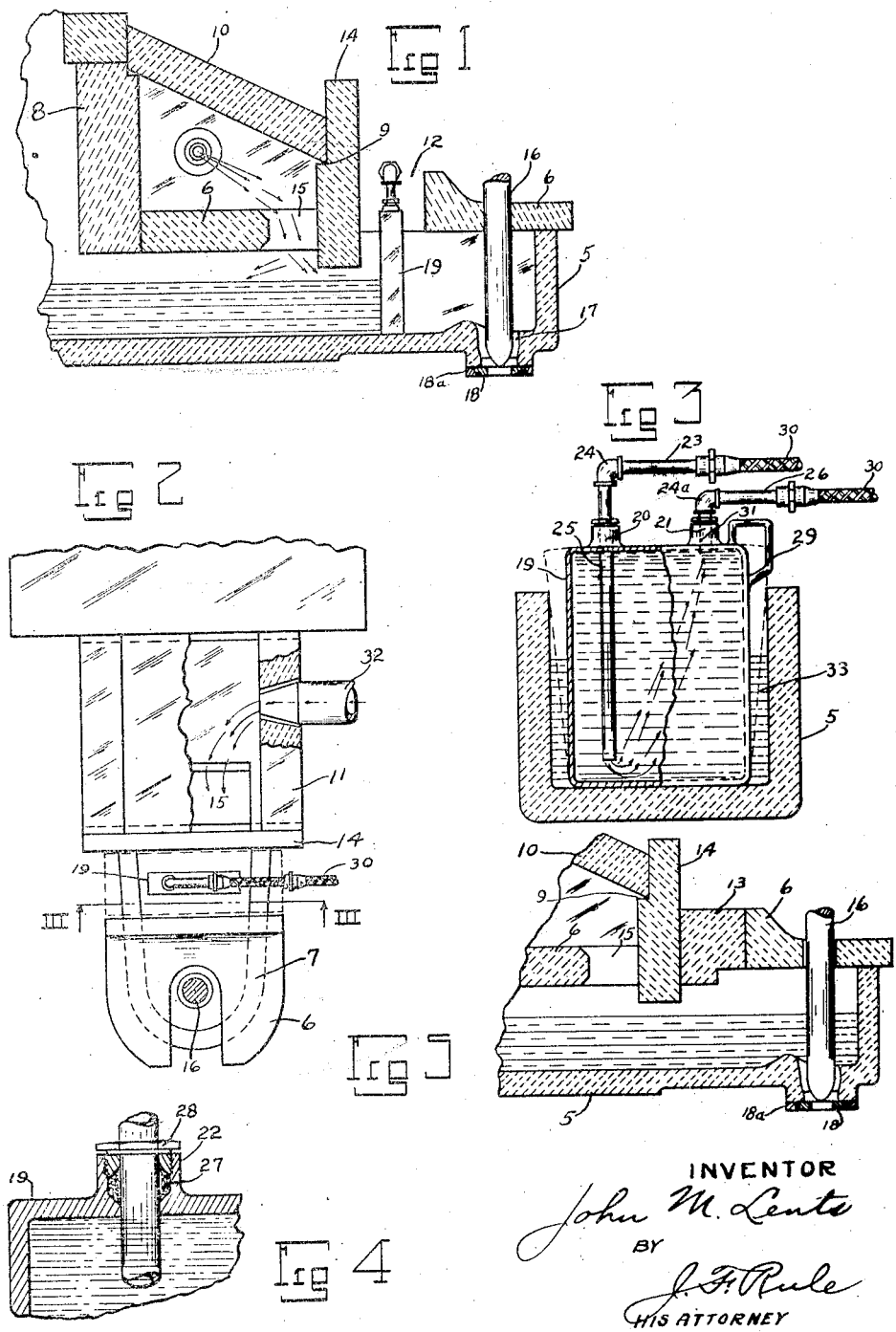

1,642,881

UNITED STATES PATENT OFFICE.

JOHN MURL LENTS, OF EVANSVILLE, INDIANA, ASSIGNOR TO THE OWENS BOTTLE COMPANY, OF TOLEDO, OHIO, A CORPORATION OF OHIO.

CHANGING GLASS-FEEDER BUSHINGS.

Application filed October 12, 1925. Serial No. 61,965.

My invention relates to a method and means for manipulating and controlling molten glass and is of particular value for use in connection with glass feeding apparatus of the type in which molten glass is discharged through an outlet, usually in the bottom of a container, as, for example, the usual furnace boot or extension. The invention, however, is not limited to such use.

In apparatus of the character indicated, the outlet orfice is usually provided with a removable ring or bushing, ordinarily made of refractory clay. Frequent removal of such bushings and replacement by new bushings is required in practice, as they wear rapidly, owing to the corroding and abrasive action of the issuing glass and the severe temperature conditions to which they are subjected. A usual method of controlling the glass when the removal of a bushing is necessary, has been to move a plug downward through the glass into the outlet to check the flow and also reduce the temperature of the glass until the flow is stopped or reduced sufficiently to permit removal of the bushing. The latter is then replaced by a new bushing, the plug withdrawn and the glass reheated until a normal flow is again established. This method consumes considerable time, particularly on account of the time required to reheat the glass to a working temperature.

An object of my invention is to provide a novel and practical method and means for controlling the glass in a feeder of the character above indicated, permitting a quick removal and replacement of the outlet bushing and quick reestablishment of the flow, while maintaining the glass at its normal working temperature during such operation.

More particularly, the invention comprises means for obstructing the flow of glass at a point behind the outlet by inserting an obstruction in the boot or flow spout and thereby separating the feeding section of the spout from the remainder of the spout, allowing the glass in front of the obstruction to quickly drain through the outlet, allowing the outlet bushing to be quickly removed and replaced by a new bushing, means also being provided for maintaining the glass behind the obstruction at a working temperature, thereby avoiding the necessity of reheating the glass to establish a normal flow.

Other objects of the invention will appear hereinafter.

Reference being had now to the accompanying drawings forming a part of this specification:

Fig. 1 is a fragmentary sectional elevation of the forward end of a boot or container of a feeder, constructed in accordance with the principles of my invention.

Fig. 2 is a plan view, with parts broken away, of the heating chamber.

Fig. 3 is an enlarged part sectional view of my device taken at the line III—III of Fig. 2, and shows a tank in part section.

Fig. 4 is a fragmentary section of Fig. 1, showing the packing gland used in my preferred form of invention.

Fig. 5 is a fragmentary sectional elevation of the forward end of a boot or container further illustrating my preferred form of invention.

Referring to the drawings for a description in detail of the construction therein illustrated, a boot or container 5 made of any suitable refractory material will be seen, provided with a forward portion having slightly converging walls 7. A roof element 6, also of refractory material, is disposed over the boot. Rising up from the said roof are vertical walls 8, 11 and 14 which form the sides of a heating chamber above the roof. The vertical walls 8 and 14 are cut away on their inner sides to present small shelves 9, which support a removable element 10 forming a cover to the heating chamber. The roof of the boot 6 is formed at 12 with a transverse opening wherein a removable block 13 may be disposed. The roof under the heating chamber is further cut away at 15 to provide an outlet passageway for directing heating products over the glass in the receptacle adjoining the said opening in the roof at 12. The bottom flooring of the forward portion of the boot is formed with an outlet orifice 17, said orifice surrounded on the outside with a bushing 18 of suitable refractory material, carried in a metal ring 18ª.

As will best be seen from Fig. 3, a water patch 19 consisting of a hollow metal block or tank conforming to the shape of the boot, is designed to loosely fit across the said boot in the opening made by the removal of the block 13 hereinbefore described. The water patch 19 is preferably constructed of metal and has formed on its upper surface, two openings 20 and 21. A vertical pipe 25 connected to an inlet pipe 23 by an elbow 24, extends through the opening 20 of the water patch to just short of the bottom of the latter and supplies cooling water to said patch. A short length of pipe connected to an outlet pipe 26 by an elbow 24ª, enters the water patch through the opening 21 a short distance. Where the said pipes 25 and 31 enter the water patch through the openings 20 and 21 respectively, packings 27 disposed within glands 22 and compressed by gland nuts 28, serve to make a water-tight connection.

A handle 29 is securely fastened to a corner of the water patch. Flexible hose 30 are coupled to pipes 23 and 26. A burner nozzle 32 enters the heating chamber through an aperture in the side wall 11, and supplies heat to the glass adjoining the heating chamber. It will be noted from an inspection of Fig. 1, that the wall 14 projects a little below the roof 6 and stops short of the ordinary height of the molten glass in the container, thereby leaving a small channelway immediately over the glass for heating products to contact with the glass beneath the said vertical wall 14. It is obvious that suitable mechanism may be provided for the insertion, the rocking, and the ultimate removal of a loosely fitting water patch, thereby making the operation of my device completely automatic.

Mode of operation.

When the bushing 18 is found to be in need of renewal, the block or closure 13 (see Fig. 5) is removed. The water patch 19 is inserted in the opening through the roof obtained by the removal of the said block 13, and lowered down into the molten glass (see Figs. 1 and 3).

A continuous circulation of fluid, preferably water, is maintained through the water patch by the connections hereinbefore described. The molten glass coming in contact with the cool sides of the patch 19, is slightly chilled and thereby, to a certain extent, a congealed or stiffened coating of glass is formed around the said patch. The coating 33 (see Fig. 3) of congealed glass around the sides of the water patch, presents a very effectual sealing means, permitting the glass in front of the water patch to be drained off through the outlet 17. It will be apparent that the above described water patch completely segregates the front portion of the boot or container.

In order to maintain the sealing medium 33 in a plastic state, I contemplate the provision of means for working or agitating the said medium 33. The water patch 19 is continuously agitated during the whole operation of changing the clay bushing. This agitation of the patch may be caused either by manual or mechanical means. In my preferred form of invention, I have shown only manual means for accomplishing this purpose.

The heating chamber supplies heat to the glass adjoining the inserted water patch and the glass in the boot, and prevents the same from becoming chilled during the operation of changing the bushing.

After the patch is in place and the segregation of the container is complete, the glass in the forward part of the boot or container is quickly drained, leaving that part of the boot free to be worked upon. The old bushing is removed, an application of clay wash is applied, and a new bushing is secured under the discharge orifice. The latter is all done with prompt dispatch. The water patch is then removed, and the block replaced in its seat in the roof 6. It has been found in practice that the entire operation can easily be performed in a period of five minutes, more or less.

Modifications of the above may be made within the spirit and scope of my invention.

What I claim is:

1. The method of temporarily obstructing the flow of molten glass through a channel or passageway at a predetermined point and permitting the glass beyond said point to be withdrawn, which comprises placing a mechanical obstruction across the path of the glass at said point, agitating said obstruction to prevent freezing of the obstruction to the walls of the channel, and removing from the channel the glass beyond said obstruction.

2. The method of temporarily obstructing the flow of molten glass through a channel or passageway at a predetermined point and permitting the glass beyond said point to be withdrawn, which comprises placing a mechanical obstruction across the path of the glass at said point, extracting heat from the glass between said obstruction and the walls of the channel sufficiently to congeal the glass, agitating the obstructing device to prevent it from freezing to the channel walls, and withdrawing the glass in the channel beyond the obstruction.

3. The method of temporarily arresting the movement of molten glass through a channel at a predetermined point and permitting the glass beyond said point to be removed, which consists in placing in the glass at said point an obstructing device extending across the channel, extracting through said obstructing device sufficient heat from the glass between the obstructing device and channel walls to partially congeal the glass, and maintaining a relative movement between the walls of said obstructing device and the walls of the channel to prevent freezing of the obstructing device to the channel walls.

4. The method of temporarily arresting the movement of molten glass through a channel at a predetermined point and permitting the glass beyond said point to be removed, which consists in placing in the glass at said point an obstructing device extending across the channel, maintaining a circulation of cooling fluid within the obstructing device, and agitating the obstructing device to prevent it from freezing to the channel walls.

5. The method of temporarily arresting the movement of molten glass through a channel at a predetermined point and permitting the glass beyond said point to be removed, which consists in placing in the glass at said point an obstructing device extending across the channel, extracting through said obstructing device sufficient heat from the glass between the obstructing device and channel walls to partially congeal the glass, maintaining a relative movement between the walls of said obstructing device and the walls of the channel to prevent freezing of the obstructing device to the channel walls, and applying heat to the glass in the channel behind said obstructing device.

6. The combination of means providing a channel through which molten glass is caused to flow, an obstructing device projecting downward into the glass and extending across the channel and leaving narrow spaces between the channel walls and the obstructing device, and means for moving the obstructing device back and forth transversely of the channel and thereby preventing it from freezing to the channel walls.

7. The combination of means providing a channel through which molten glass is caused to flow, an obstructing device projecting downward into the glass and extending across the channel and leaving narrow spaces between the channel walls and the obstructing device, means for circulating a cooling medium through said obstructing device, and means for vibrating the obstructing device and thereby preventing it from freezing to the channel walls.

8. The combination of means providing a channel or passageway through which molten glass is caused to flow, means for temporarily partitioning the channel at a predetermined point and thereby arresting the movement of glass back of said point while permitting the withdrawal of glass in front of said point, said partitioning means comprising a hollow metal plate extending downward into the glass in the channel and of a width to provide narrow spaces between the channel walls and said plate, means for circulating a cooling fluid through said plate to partially congeal the surrounding glass, and means for causing a sustained agitation of said plate throughout the period of time the glass is arrested and thereby preventing the plate from adhering to the channel walls.

9. In glass feeding apparatus, the combination of a container for molten glass having an outlet opening in the bottom thereof through which the glass is discharged, means for temporarily damming the glass at a point behind the outlet and permitting the glass in front of the dam to drain off through the outlet, said means comprising an obstructing plate projecting downward into the glass in the container and extending transversely of the container, said plate being of somewhat less width than the interior width of the container, leaving narrow passageways between the walls of the container and said plate, and means for causing a sustained agitation of said plate throughout the period of time the glass is dammed and thereby preventing the plate from adhering to the walls of the container.

10. In glass feeding apparatus, the combination of a container for molten glass having an outlet opening in the bottom thereof through which the glass is discharged, means for temporarily damming the glass at a point behind the outlet and permitting the glass in front of the dam to drain off through the outlet, said means comprising an obstructing plate projecting downward into the glass in the container and extending transversely of the container, said plate being of somewhat less width than the interior width of the container, leaving narrow passageways between the walls of the container and said plate, means for circulating a cooling medium through said plate, and means for causing a sustained agitation of said plate throughout the period of time the glass is dammed and thereby preventing said plate from freezing to the walls of the container.

Signed at Evansville, in the county of Vanderburg and State of Indiana, this second day of October, 1925.

JOHN MURL LENTS.